(12) United States Patent
Zheng

(10) Patent No.: US 11,230,443 B2
(45) Date of Patent: Jan. 25, 2022

(54) DISPLAY PANEL VACUUM SUCTION SYSTEM

(71) Applicant: Wuhan China Star Optoelectronics Technology Co., LTD., Hubei (CN)

(72) Inventor: Junfeng Zheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 313 days.

(21) Appl. No.: 16/485,427

(22) PCT Filed: Apr. 11, 2019

(86) PCT No.: PCT/CN2019/082165
§ 371 (c)(1),
(2) Date: Aug. 12, 2019

(87) PCT Pub. No.: WO2020/113878
PCT Pub. Date: Jun. 11, 2020

(65) Prior Publication Data
US 2021/0331876 A1    Oct. 28, 2021

(30) Foreign Application Priority Data

Dec. 4, 2018 (CN) .......................... 201811470321.2

(51) Int. Cl.
*B65G 49/06* (2006.01)
*B25J 15/06* (2006.01)
*B65G 47/91* (2006.01)

(52) U.S. Cl.
CPC ........ *B65G 49/061* (2013.01); *B25J 15/0625* (2013.01); *B65G 47/918* (2013.01); *B65G 2249/045* (2013.01)

(58) Field of Classification Search
CPC ................ B65G 49/061; B65G 47/918; B65G 2249/045; B25J 15/0625
See application file for complete search history.

(56) References Cited

U.S. PATENT DOCUMENTS 4,129,328 A    12/1978  Littell
4,334,708 A    6/1982   Westin
(Continued)

FOREIGN PATENT DOCUMENTS

CN    104016218 A    9/2014
CN    206561433 U    10/2017
(Continued)

*Primary Examiner* — Stephen A Vu
(74) *Attorney, Agent, or Firm* — Benesch, Friedlander, Coplan & Aronoff LLP

(57) ABSTRACT

A display panel vacuum suction system includes a control device, a robot arm, and a vacuum device. The robot arm includes two or more retractable rods, and each of the retractable rods is connected with a vacuum plate. Each vacuum chamber is disposed in each of the vacuum plates, and each vacuum hole is disposed on a surface of each of the vacuum plates, wherein each vacuum chamber is connected with the vacuum device by a suction pipe. The control device controls expansion and retraction of the retractable rods of the robot arm, so that the vacuum plates connected with the retractable rods can be combined to pick up a single display panel or pick up two display panels respectively. By combining vacuum plates, and controlling the opening or closing of the vacuum holes of each of the vacuum plates, different sizes of display panels can be sucked.

9 Claims, 9 Drawing Sheets

(56) References Cited

U.S. PATENT DOCUMENTS

| | | | | |
|---|---|---|---|---|
| 7,105,056 | B2* | 9/2006 | Hartig | B65G 49/061 |
| | | | | 118/50 |
| 10,781,056 | B2* | 9/2020 | Filipovic | F01D 5/282 |
| 10,875,194 | B1* | 12/2020 | Coleman | B25J 15/0683 |
| 2005/0263949 | A1* | 12/2005 | Boyl-Davis | B25B 11/007 |
| | | | | 269/266 |
| 2014/0199153 | A1* | 7/2014 | Reinhold | B65H 3/0816 |
| | | | | 414/800 |

FOREIGN PATENT DOCUMENTS

| | | | |
|---|---|---|---|
| CN | 207346780 U | * | 5/2018 |
| CN | 108674989 A | | 10/2018 |

* cited by examiner

DISPLAY PANEL VACUUM SUCTION SYSTEM

FIELD OF INVENTION

This invention relates a display panel vacuum suction system, which can pick up and transfer display panels during manufacturing process.

BACKGROUND OF INVENTION

Currently, the display panel market is moving toward large sizes and special shapes. In the manufacturing process of various sizes of panels, sizes of the vacuum suction components are limited, so sizes of each type (i.e. large panel, block, or chip) of panels are also greatly limited. This will greatly affect the product development process, reduce utilization rates of large panels, increase production cost of products, and even cannot meet special needs of customers, and then lose the market and break customer trust.

In the development process of display panels, panels of different sizes are turned out, so there are many requirements for suction for different sizes of products. In order to break through the limit of conventional factory production lines, it is usually necessary to rebuild the production lines, which will result in expensive costs, thereby greatly increasing the development cost of the production.

Therefore, it is necessary to develop a suction device suitable for more suction requirements.

TECHNICAL PROBLEMS

An object of the present invention is to provide a display panel vacuum suction system, which can effectively solve the problems of the conventional panel suction device such as a single panel size, poor suction capacity, and high development cost in the production of a special size display panel.

SUMMARY OF INVENTION

An object of the present invention is to provide a display panel vacuum suction system, which can effectively solve the problems of the conventional panel suction device such as a single panel size, poor suction capacity, and high development cost in the production of a special size display panel.

In order to solve the above technical problems, the technical solution in one embodiment of the present invention is as follows:

A display panel vacuum suction system includes a control device, a robot arm, and a vacuum device. The robot arm includes two or more retractable rods, and each of the retractable rods is connected with a vacuum plate. Each vacuum chamber is disposed in each of the vacuum plates, and each vacuum hole is disposed on a surface of each of the vacuum plates, wherein each of the vacuum chamber is connected with the vacuum device by a suction pipe. The control device controls expansion and retraction of the retractable rods of the robot arm, so that the vacuum plates connected with the retractable rods can be combined to pick up a single display panel or pick up two display panels.

Further, a number of the vacuum holes on the vacuum plates is two or more.

Further, the vacuum holes are arranged in two or more rows on the vacuum plates.

Further, a baffle is disposed in each of the vacuum holes; and wherein the control device comprises a switch control circuit for opening or closing the baffles of the vacuum holes, thereby enabling or disabling the suction function of the vacuum holes.

Further, the switch control circuit is disposed in the retractable rods.

Further, each of the suction pipe is disposed in the retractable rod.

Further, a shape of the vacuum plates comprises one of a square, a rectangle, a fan, a circle, an ellipse, or a triangle.

Further, the two or more vacuum plates can be combined into one of a complete shape such as a square, a rectangle, a circle, an ellipse, a triangle, or a polygon.

Further, the robot arm comprises four retractable rods, each of the retractable rods is connected with a fan-shaped vacuum plate, and the four fan-shaped vacuum plates can be combined to form a complete circle or ellipse.

Further, the vacuum suction system comprises two or more robot arms, and each of the robot arms comprises two or more retractable rods.

BENEFICIAL EFFECT

The invention provides a display panel vacuum suction system. By providing a plurality of vacuum holes on the first vacuum plate and the second vacuum plate, and providing metal baffles in the vacuum holes, a panel with a small weight can be picked up. Alternatively, the first vacuum plate and the second vacuum plate can be combined to increase the suction capacity of the vacuum suction system.

The invention provides a display panel vacuum suction system, which comprises two or more vacuum plates. By combining a plurality of vacuum plates, a large-sized display panel can be sucked and held. Alternatively, separated vacuum plates can suck and hold a plurality of small-sized display panels, so that the application range is wider.

Further, a plurality of vacuum holes are disposed on each of the vacuum plates, by arranging the opening and closing of the plurality of vacuum holes, the suction range of the display panel can be adjusted, thereby expanding the application range.

DESCRIPTION OF DRAWINGS

In order to more clearly illustrate the technical solutions in the embodiments of the present invention, the drawings which are used in the description of the embodiments will be briefly described below. It is obvious that the drawings in the following description are only some embodiments of the present invention. Other drawings can also be obtained from those skilled in the art without paying any creative effort.

Figure 1:
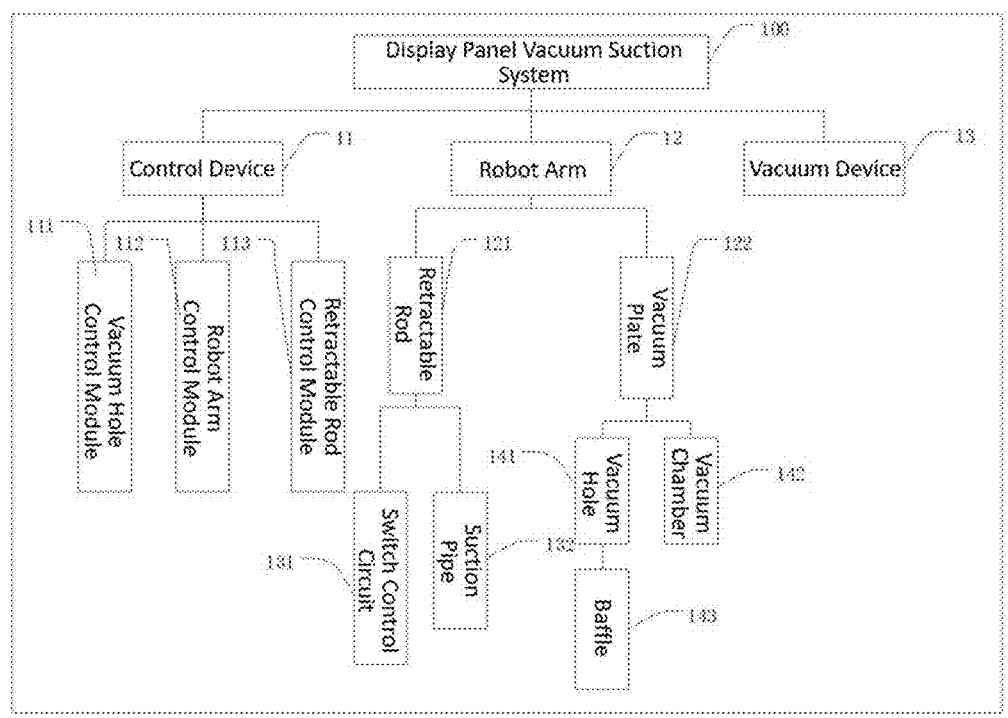
FIG. 1 is a schematic view showing the functional modules of the display panel vacuum suction system according to the present invention.

100 display panel vacuum suction system
11 control device
12 robot arm
13 vacuum device
111 vacuum hole control module
112 robot arm control module
113 retractable rod control module
121 retractable rod
122 vacuum plate
131 switch control circuit
132 suction pipe
141 vacuum hole
142 vacuum chamber
143 baffle

DETAILED DESCRIPTION OF PREFERRED EMBODIMENTS

The embodiments of the present invention are described in detail below, and the examples of the embodiments are illustrated in the drawings, wherein the same or similar reference numerals indicate the same or similar elements or elements having the same or similar functions. The embodiments described below with reference to the drawings are intended to be illustrative of the invention and are not to be construed as limitation.

In the description of the present invention, it is to be understood that the terms "center", "longitudinal", "transverse", "length", "width", "thickness", "upper", "lower", "front", "post", "left", "right", "vertical", "horizontal", "top", "bottom", "inside", "outside", "clockwise", "counterclockwise", etc. are based on the orientation or positional relationship shown in the drawings, and are merely for the convenience of the description of the present invention. These are not intended to indicate or imply that the device or component has a specific orientation, and is constructed and operated in a specific orientation. Therefore, it cannot be understood as a limitation on the present invention. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present invention, the meaning of "a plurality" is two or more, unless specifically defined otherwise.

In the description of the present invention, unless specifically regulated and limited, the terms such as "fix", "link", and "connect" are to be understood broadly. For example, the parts can be fixedly connected, detachably connected or integrally connected; the parts can be mechanically connected, electrically connected or communicated with each other; the part can be directly connected or indirectly connected through a medium; and two parts can be internally communicated or interacted with each other. For one skilled in the art, it is easy to understand the specific meaning of the above words in the present invention.

In the description of the present invention, unless specifically regulated and limited, the first feature is "above" or "below" the second feature, which means that the first feature can directly contact with the second feature, or the first feature can indirectly contact with the second feature through other features therebetween. Moreover, the first feature is "above" the second feature, which means that the first feature is directly above and above the second feature, or merely means that the first feature is higher than the second feature on horizontal height. The first feature is "below" the second feature, which means that the first feature is directly above and above the second feature, or merely means that the first feature is lower than the second feature on horizontal height.

The following disclosure provides many different embodiments or examples to implement different structures of the present invention. For simplifying the disclosure of the present invention, components and arrangements of specific examples will be described below. Of course, they are merely examples and not intended to limit the invention. In addition, reference numbers and/or reference letters may be repeated in different examples in the invention, and such repetitions are made for simplicity and clarity and do not indicate relationships between each of the discussed embodiments and/or arrangements. Moreover, the present invention provides examples of various specific processes and materials. However, those of ordinary skill in the art may realize use of other processes and/or use of other materials.

As shown in FIG. 1, this invention provides a display panel vacuum suction system 100, including a control device 11, a robot arm 12, and a vacuum device 13.

Further, the control device 11 includes a vacuum hole control module 111, a robot arm control module 112, and a retractable rod control module 113.

The control device 11 controls expansion or retraction of each retractable rod of the robot arm by the robot arm control module 112 and the retractable rod control module 113, so that the retractable rod and a vacuum plate 122 connected with the retractable rod can suck and hold a single display panel. For small display panels, if the number of the retractable rods is two or more, the display panel vacuum suction system will pick up two or more display panels respectively. It is also possible to carry out the suction by using two vacuum plates 122 simultaneously, which can improve the suction efficiency.

Figure 2:
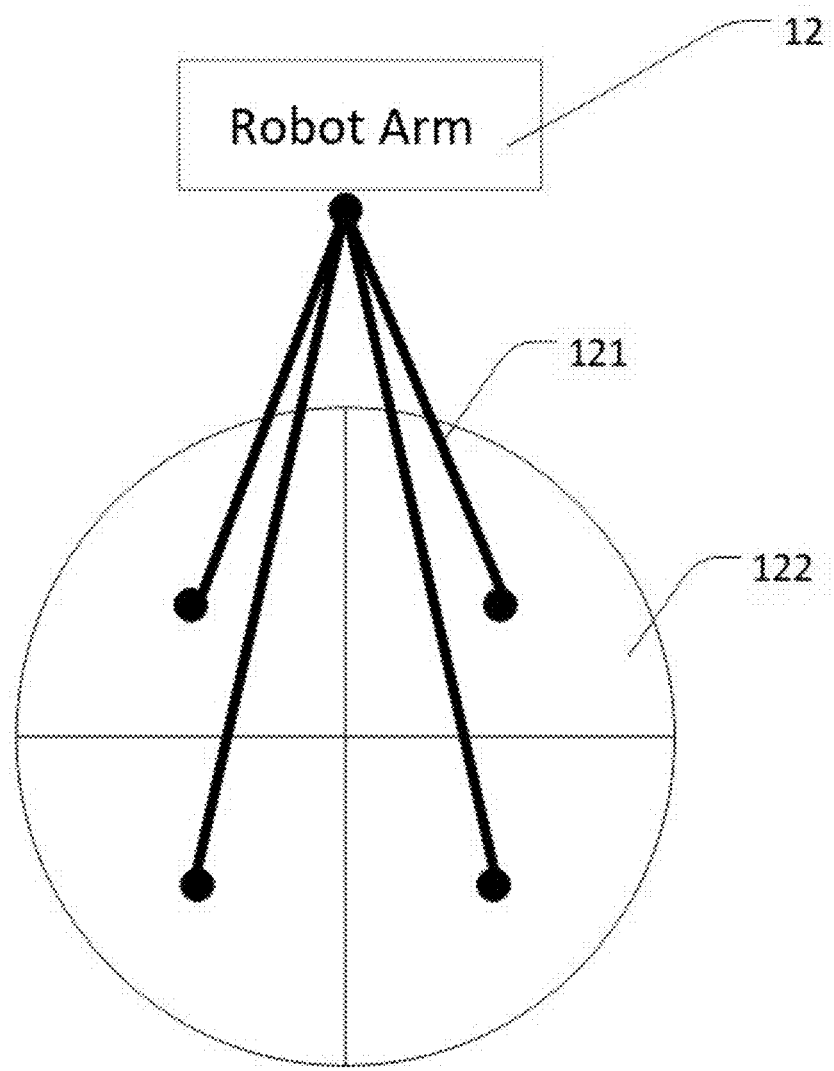
FIG. 2 is a schematic view showing the connection structure of the robot arm, the retractable rods, and the vacuum plates according to the present invention.

As shown in FIG. 2, each of the robot arms 12 includes two or more retractable rods, in this embodiment the robot arm 12 includes four retractable rods, and each of the retractable rods is connected with a vacuum plate. Each vacuum hole 141 is disposed on a surface of each of the vacuum plates 122, wherein each vacuum chamber 142 is connected with the vacuum device 13 by a suction pipe 132. For heavy panels, the control device 11 controls retraction of each of the retractable rods of the robot arm, so that the vacuum plates connected with the four retractable rods can be combined to pick up a single display panel.

A shape of the vacuum plates 122 comprises one of a square, a rectangle, a fan, a circle, an ellipse, or a triangle. In this embodiment, the shape of the vacuum plates 122 is a fan.

Further, two or more vacuum plates 122 can be combined into one of a complete shape such as a square, a rectangle, a circle, an ellipse, a triangle, or a polygon. In the best mode, the robot arm 12 includes four retractable rods 121, each of the retractable rods 121 is connected with a fan-shaped vacuum plate 122, and the four fan-shaped vacuum plates 122 can be combined to form a complete circle or ellipse.

Figure 3:
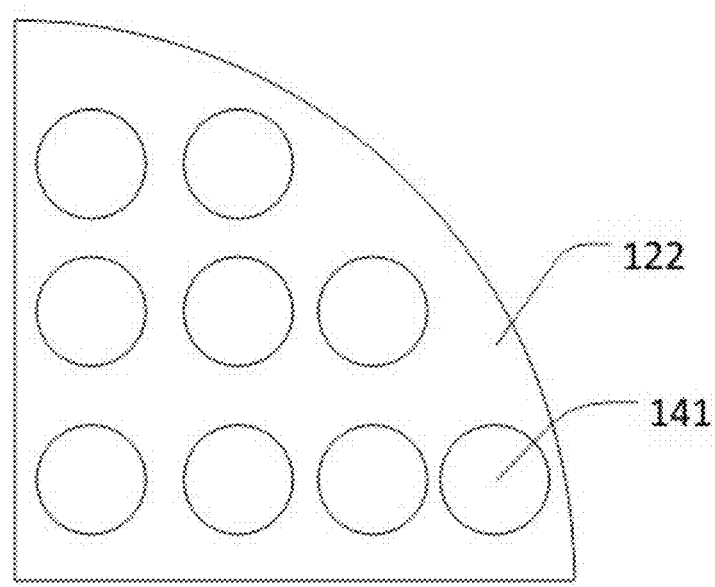
FIG. 3 is a schematic structural view showing the vacuum plate and the vacuum holes according to the present invention.

As shown in FIG. 3, a number of the vacuum holes 141 on the vacuum plates 122 is two or more. In this embodiment, nine vacuum holes 141 are on the vacuum plate 122. Wherein the vacuum holes 141 are arranged in two or more rows on the vacuum plates 122. In the embodiment, there are three rows on the vacuum plate 122.

Figure 4:
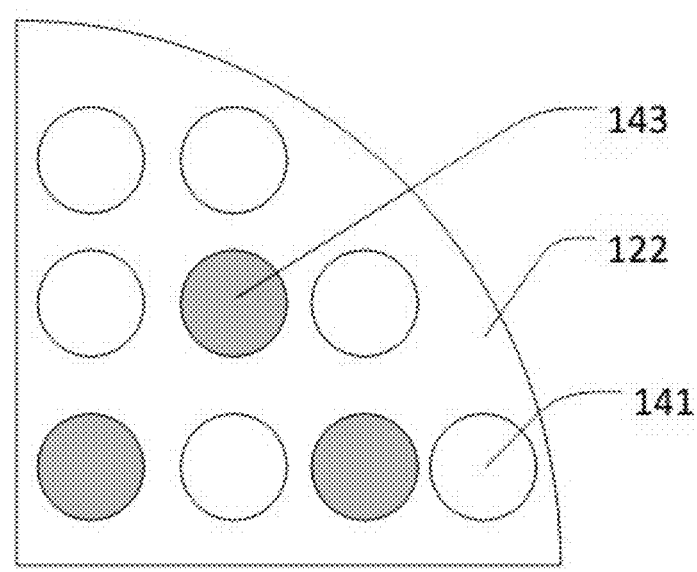
FIG. 4 is a schematic structural view showing the opening or closing of the vacuum holes according to the present invention.

As shown in FIG. 4, each baffle 143 is disposed in each of the vacuum holes 141. The control device 11 comprises a switch control circuit 131 for opening or closing the baffles 143 of the vacuum holes 141, thereby enabling or disabling the suction function of the vacuum holes 141.

The switch control circuit 131 is disposed in the retractable rods 121, and each of the suction pipe 132 is disposed in the retractable rod. The vacuum hole control module 111 of the control device 11 controls the opening or closing of the vacuum holes 141, so that smaller panels can be sucked and held.

Figure 5:
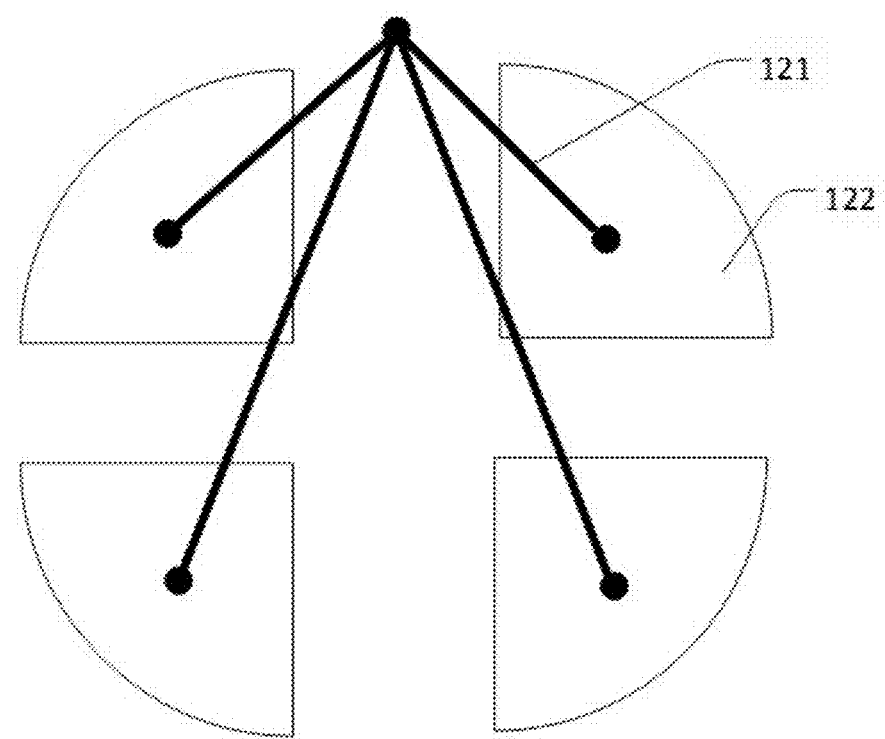
FIG. 5 is a schematic structural view showing the separated vacuum plates according to the present invention.

As shown in FIG. 5, for heavier display panels, the control device 11 controls expansion of each of the retractable rods of the robot arm 12 and turns on the vacuum device 13, so that the vacuum plates 122 connected with the four retractable rods move outward and suck. In this state, the fan-shaped vacuum plates 122 are separated, and by pulling of the robot arm 12, the suction system can suck and hold a larger panel.

Figure 6:
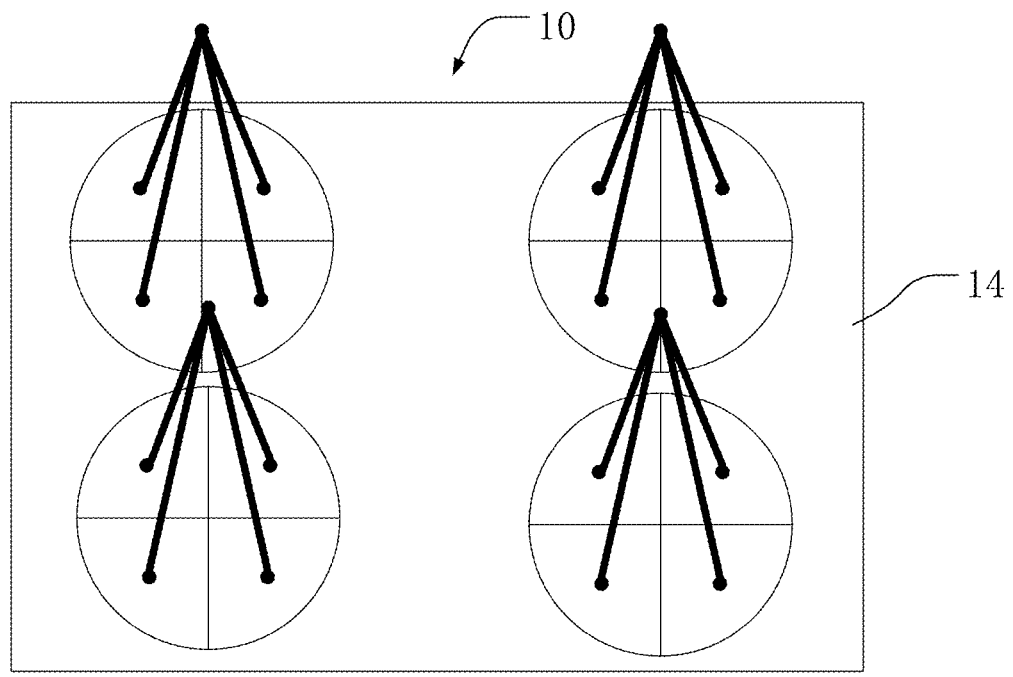
FIG. 6 is a schematic structural view showing the suction of the plurality of robot arms sucked according to the present invention.

As shown in FIG. 6, in another embodiment of this invention, the vacuum suction system includes two or more robot arms 12, and each of the robot arms 12 includes two or more retractable rods.

Specifically, there are four robot arms 12, each of the robot arms 12 includes four retractable rods 121, and each of the retractable rods 121 is connected with each of the vacuum plates 122. When the vacuum device 13 is turned on, the vacuum plates 122 will suck and hold display panels.

The control device 11 controls retraction of each retractable rod 121 of each robot arm 12, so that the vacuum plates 122 connected with the four retractable rods 121 can be combined and perform suction. Four fan-shaped vacuum plates 122 form a circular or elliptical vacuum plate 122, and the formed circular or elliptical vacuum plates 122 suck and hold four corners of the display panel respectively, so the suction system can pick up a larger display panel.

Figure 7:
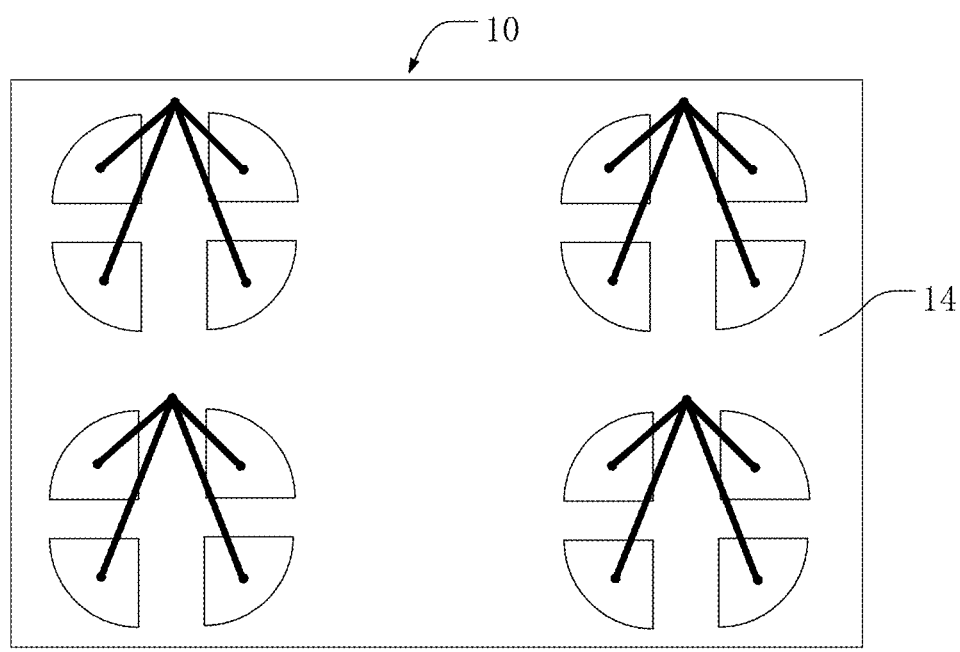
FIG. 7 is a schematic structural view showing the separated vacuum plates of the plurality of robot arms according to the present invention.

As shown in FIG. 7, the difference from the embodiment in FIG. 6 is that the control device 11 controls expansion of each retractable rod of each robot arm 12, such that the vacuum plates 122 of the four retractable rods 121 can perform suction separately, so the suction system can pick up a heavier display panel.

Figure 8:
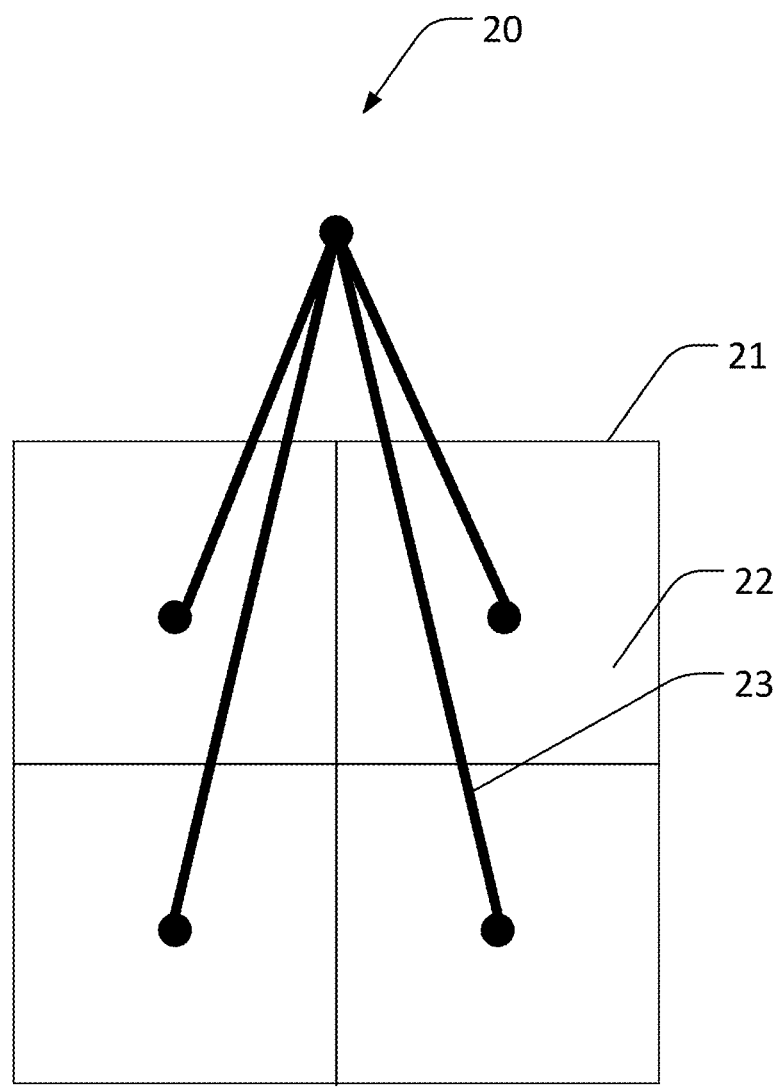
FIG. 8 is a schematic structural view showing the square vacuum plate according to the second embodiment of the present invention.

Another embodiment as shown in FIG. 8, the difference from the embodiment in FIG. 2 is that the vacuum plates 22 are square or rectangular, and the side lengths of the vacuum plates 22 are the same with the radius of the fan-shaped vacuum plate in FIG. 2.

Figure 9:
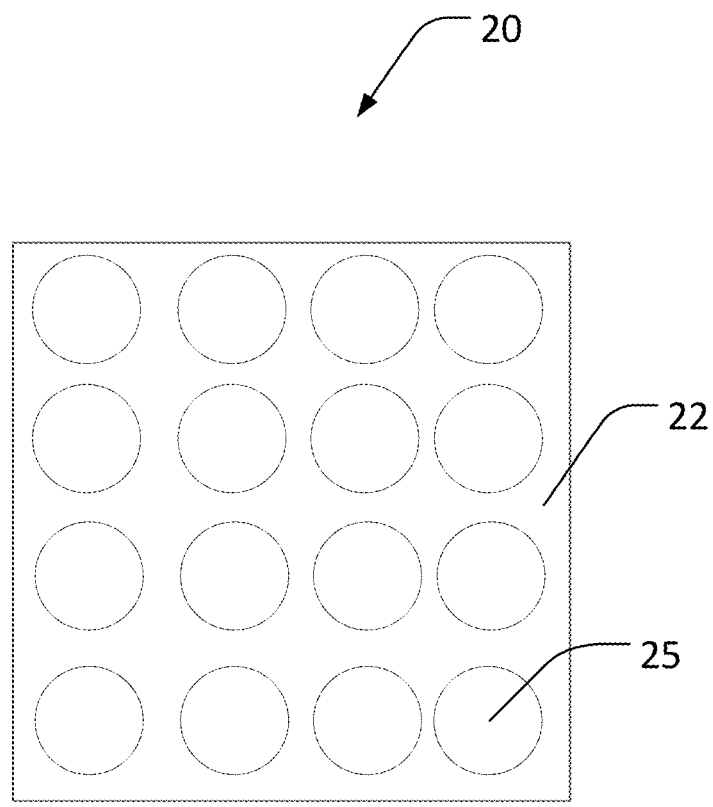
FIG. 9 is a schematic structural view showing the vacuum holes of a square vacuum plate according to the second embodiment of the present invention.

As shown in FIG. 9, a number of the vacuum holes 25 on the vacuum plates 22 is sixteen, wherein the sizes of the vacuum holes 25 are the same with the vacuum holes 141 in FIG. 3, and the shapes of the vacuum holes are all circles. Compared with the embodiment in FIG. 3, the area of the vacuum plates 22 is increased, and the number of the vacuum holes 25 on the vacuum plates 22 is also increased, so a heavier display panel can be sucked and held.

In the actual panel manufacturing process, it is not necessary to modify the entire production line to meet the needs of larger panels, and the huge cost brought by the transformation of the production line can be avoided.

Figure 10:
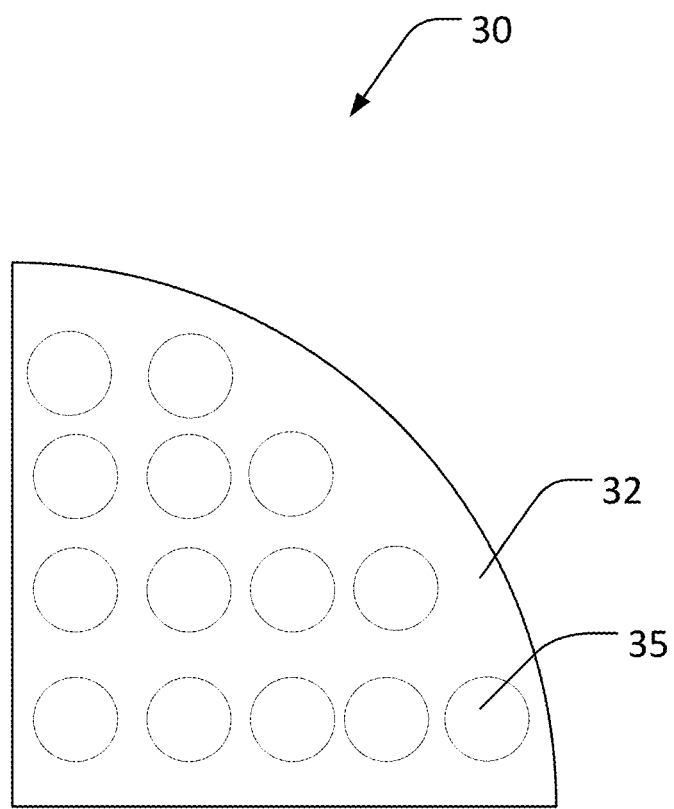
FIG. 10 is a schematic structural view showing the vacuum holes according to the third embodiment of the present invention.

As shown in FIG. 10, a number of the vacuum holes on the vacuum plates is fourteen, and the vacuum holes are arranged in 4 horizontal rows on the vacuum plate 32. The area of the vacuum plate 32 is the same with the area of the vacuum plate in FIG. 3, i.e. the number of the vacuum holes is increased by reducing the sizes of the vacuum holes 35.

In the embodiment in FIG. 10, the suction capacity is not increased, but the suction system can be used to suck and hold smaller panels by providing smaller vacuum holes 35. By controlling the opening or closing of the vacuum holes 35 by the vacuum hole control module 111, the suction system can pick up different sizes of display panels.

The embodiments of the present invention have been described in detail above, and the principles and embodiments of the present invention are described in detail herein. The description of the above embodiments is only for the purpose of understanding the present invention. In the meantime, those skilled in the art will be able to change the specific embodiments and the scope of application according to the idea of the present invention. In summary, the content of the present specification should not be construed as limiting the present invention.

What is claimed is:

1. A display panel vacuum suction system, comprising:
a control device, a robot arm, and a vacuum device;
wherein the robot arm comprises two or more retractable rods, and each of the retractable rods is connected with a vacuum plate;
wherein each vacuum chamber is disposed in each of the vacuum plates, and each vacuum hole is disposed on a surface of each of the vacuum plates, wherein each of the vacuum chamber is connected with the vacuum device by a suction pipe;
wherein the control device controls expansion and retraction of the retractable rods of the robot arm, so that the vacuum plates connected with the retractable rods can be combined to pick up a single display panel or pick up two display panels, and
wherein number of the vacuum holes on the vacuum plates is two or more.

2. The display panel vacuum suction system as claimed in claim 1, wherein the vacuum holes are arranged in two or more rows on the vacuum plates.

3. The display panel vacuum suction system as claimed in claim 1, wherein a baffle is disposed in each of the vacuum holes; and wherein the control device comprises a switch control circuit for opening or closing the baffles of the vacuum holes, thereby enabling or disabling the suction function of the vacuum holes.

4. The display panel vacuum suction system as claimed in claim 3, wherein the switch control circuit is disposed in the retractable rods.

5. The display panel vacuum suction system as claimed in claim 1, wherein each of the suction pipe is disposed in the retractable rod.

6. The display panel vacuum suction system as claimed in claim 1, wherein a shape of the vacuum plates comprises is selected from the group consisting of a square, a rectangle, a fan, a circle, an ellipse, and a triangle.

7. The display panel vacuum suction system as claimed in claim 6, wherein the two or more vacuum plates can be combined into one of a complete shape selected from the group consisting of a square, a rectangle, a circle, an ellipse, a triangle, and a polygon.

8. The display panel vacuum suction system as claimed in claim 1, wherein the robot arm comprises four retractable rods, each of the retractable rods is connected with a fan-shaped vacuum plate, and the four fan-shaped vacuum plates can be combined to form a complete circle or ellipse.

9. The display panel vacuum suction system as claimed in claim 1, wherein the vacuum suction system comprises two or more robot arms, and each of the robot arms comprises two or more retractable rods.

* * * * *